(12) United States Patent
Segal et al.

(10) Patent No.: US 9,026,974 B2
(45) Date of Patent: May 5, 2015

(54) SEMICONDUCTOR INTEGRATED CIRCUIT PARTITIONING AND TIMING

(71) Applicant: Synopsys, Inc., Mountain View, CA (US)

(72) Inventors: Russell B. Segal, Sunnyvale, CA (US); Balkrishna R. Rashingkar, San Jose, CA (US); Douglas Chang, San Jose, CA (US); Mattias A. Hembruch, Fremont, CA (US)

(73) Assignee: Synopsys, Inc., Mountain View, CA (US)

( * ) Notice: Subject to any disclaimer, the term of this patent is extended or adjusted under 35 U.S.C. 154(b) by 0 days.

(21) Appl. No.: 14/140,248

(22) Filed: Dec. 24, 2013

(65) Prior Publication Data

US 2014/0181776 A1     Jun. 26, 2014

Related U.S. Application Data

(60) Provisional application No. 61/746,057, filed on Dec. 26, 2012.

(51) Int. Cl.
  *G06F 17/50*     (2006.01)
(52) U.S. Cl.
  CPC ........ *G06F 17/5081* (2013.01); *G06F 17/5072* (2013.01); *G06F 17/5031* (2013.01); *G06F 2217/84* (2013.01)
(58) Field of Classification Search
  CPC ...................................................... G06F 17/50
  USPC ......................................................... 716/123
  See application file for complete search history.

(56) References Cited

U.S. PATENT DOCUMENTS

| | | | |
|---|---|---|---|
| 2003/0046646 A1* | 3/2003 | Amano et al. ..................... 716/9 |
| 2003/0226126 A1 | 12/2003 | Iwai et al. | |
| 2005/0172252 A1* | 8/2005 | Cheng et al. ..................... 716/10 |
| 2008/0155485 A1* | 6/2008 | Lin et al. ........................... 716/7 |
| 2009/0064068 A1 | 3/2009 | Ng et al. | |
| 2009/0106722 A1* | 4/2009 | Gregory et al. ................... 716/6 |
| 2010/0058275 A1 | 3/2010 | Polomik et al. | |
| 2011/0023000 A1 | 1/2011 | Dirks et al. | |

* cited by examiner

*Primary Examiner* — Thuan Do
*Assistant Examiner* — Mohammed Alam
(74) *Attorney, Agent, or Firm* — Park, Vaughan, Fleming & Dowler LLP; Laxman Sahasrabuddhe

(57) ABSTRACT

Methods and apparatuses are described for facilitating a user to explore and evaluate different options during floorplanning. Some embodiments display a graphical representation of a circuit design floorplan, wherein the graphical representation includes a set of blocks and a set of flylines between blocks, wherein each block corresponds to a portion of the circuit design, and wherein each flyline corresponds to one or more relationships between two blocks. Additionally, a set of metrics associated with one or more blocks or one or more flylines can be displayed. Next, in response to receiving a modification to one or more blocks in the graphical representation, the embodiments can update the set of metrics without performing expensive netlist modification, placement, routing, and/or propagation of timing information through multiple levels of logic, and then display the updated set of metrics.

18 Claims, 4 Drawing Sheets

SEMICONDUCTOR INTEGRATED CIRCUIT PARTITIONING AND TIMING

RELATED APPLICATION

This application claims priority to U.S. Provisional Patent Application No. 61/746,057, entitled "What-if partitioning and what-if timing," by inventors Russ Segal, Vineet Rashingkar and Douglas Chang, filed on 26 Dec. 2012, the contents of which are herein incorporated by reference in their entirety for all purposes.

BACKGROUND

1. Technical Field

This disclosure relates to electronic design automation (EDA). More specifically, this disclosure relates to features of an EDA tool that enable fast exploration and evaluation of different partitioning options in a circuit design floorplan.

2. Related Art

Integrated circuit (IC) design involves the use of schematics that visually represent components and wires of the IC. In EDA, a floorplan typically refers to a schematic that provides at least the tentative sizes and tentative locations of the major functional blocks in an IC.

A floorplanning tool can be used to create, edit, and view a floorplan for an IC. Decisions that a circuit designer makes while creating a floorplan can have a significant impact on subsequent EDA stages. What are needed are user-friendly floorplanning tools that enable a circuit designer to create floorplans that reduce the overall circuit design time and/or improve the overall quality of results (QoR).

SUMMARY

Some embodiments described herein provide systems and techniques for facilitating the exploration and evaluation of different modifications to a circuit design floorplan. Specifically, in some embodiments, graphical representation of a circuit design floorplan can be displayed. The graphical representation can include a set of blocks and a set of flylines (a line between two blocks) between blocks, wherein each block corresponds to a portion of the circuit design, and wherein each flyline corresponds to one or more relationships between two blocks (a "relationship" between two blocks can correspond to an electrical connection between the two blocks or to a circuit path between the two blocks that is capable of propagating logical signals).

Additionally, a set of metrics associated with one or more blocks or one or more flylines can be displayed. The set of metrics can include: (1) a utilization metric that is associated with a block, and wherein the utilization metric is computed by dividing a total cell area by a total block area, (2) a connection count metric that is associated with a flyline, and wherein the connection count metric is equal to the number of connections between the two blocks that correspond to the flyline, and/or (3) a timing metric that is associated with a flyline. The timing metric can be a worst slack on a timing path between two blocks associated with the flyline, a count of timing paths whose slack is less than a given threshold, or a slack value such that a given percentile of timing paths has worse slack than the slack value. In some embodiments, one or more metrics associated with a flyline are represented using one or more of a color attribute, a width attribute, or text.

The EDA tool can enable the user to modify blocks in the graphical representation. For example, the user can resize the block, reshape the block, and/or move the block. Next, in response to receiving a modification to one or more blocks in the graphical representation, the set of metrics can be updated without performing expensive netlist modification, placement, routing, and/or propagation of timing information through multiple levels of logic, and then the updated set of metrics can be displayed. Because some of the embodiments described herein do not perform computationally expensive operations (e.g., routing), the embodiments can update the metrics almost instantaneously, thereby enabling the user to quickly explore and evaluate different options for modifying the circuit design floorplan.

DETAILED DESCRIPTION

Figure 1A:
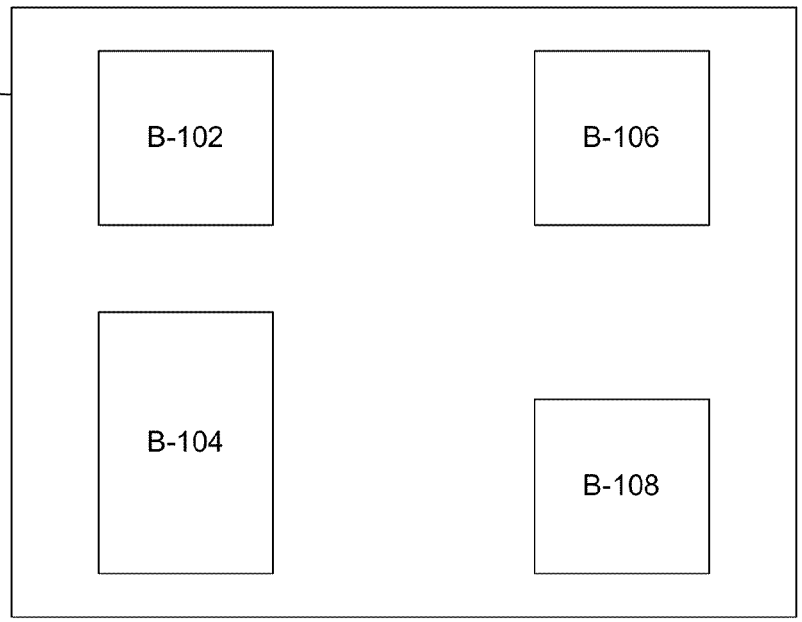
FIGS. 1A-1B illustrate examples of modifications that can be performed on a floorplan in accordance with some embodiments described herein.

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the principles and features disclosed herein.

Overview of an Electronic Design Automation (EDA) Flow

An EDA flow can be used to create a circuit design. Once the circuit design is finalized, it can undergo fabrication, packaging, and assembly to produce integrated circuit chips. An EDA flow can include multiple steps, and each step can involve using one or more EDA software tools. Some EDA steps and software tools are described below. These examples of EDA steps and software tools are illustrative purposes only and are not intended to limit the embodiments to the forms disclosed.

Some EDA software tools enable circuit designers to describe the functionality that they want to implement. These tools also enable circuit designers to perform what-if planning to refine functionality, check costs, etc. During logic design and functional verification, the HDL (hardware description language), e.g., SystemVerilog, code for modules in the system can be written and the design can be checked for functional accuracy, e.g., the design can be checked to ensure that it produces the correct outputs.

During synthesis and design for implementation, the HDL code can be translated to a netlist using one or more EDA software tools. Further, the netlist can be optimized for the target technology, and tests can be designed and implemented to check the finished chips. During netlist verification, the netlist can be checked for compliance with timing constraints and for correspondence with the HDL code.

During design planning, an overall floorplan for the chip can be constructed and analyzed for timing, power, area, and routability. During physical implementation, circuit elements can be positioned in the layout (placement) and can be electrically coupled (routing).

During analysis and extraction, the circuit's functionality can be verified at a transistor level and parasitics can be extracted. During physical verification, the design can be checked to ensure correctness for manufacturing, electrical issues, lithographic issues, and circuitry.

During resolution enhancement, geometric manipulations can be performed on the layout to improve manufacturability of the design. During mask data preparation, the design can be "taped-out" to produce masks which are used during fabrication.

What-if Partitioning and Timing

A partition or block (the terms "partition" and "block" are used interchangeably in this disclosure) can represent a portion of the circuit design. The circuit design may be partitioned into blocks based on functionality, e.g., one block may include computational circuitry (e.g., a processor) and another block may include memory circuitry (e.g., registers), etc. However, in general, a circuit design can be partitioned into different blocks based on any criteria. The EDA tool can allow users to select different levels of hierarchy to display as blocks, and the EDA tool can maintain an association between a block and a set of circuit objects (e.g., cells) that are in the block.

The GUI of a floorplanning tool can treat a block as a floorplan object that can be placed in the floorplan, and can be used to perform various operations (e.g., moving, resizing, reshaping, etc.) on the block. Decisions that a circuit designer makes while creating a floorplan can have a significant impact on subsequent EDA stages. Therefore, it is important to enable a circuit designer to evaluate different options for partitioning a circuit design into a set of blocks. However, changing a floorplan of the circuit design can cause updates to the routing, timing, buffering, etc. of the circuit design, which can require a significant amount of computational time.

Some embodiments described herein enable a circuit designer to quickly explore and evaluate changes to a floorplan without performing computationally expensive operations such as routing, performing timing updates, buffering, etc. on the circuit design.

Figure 1B:
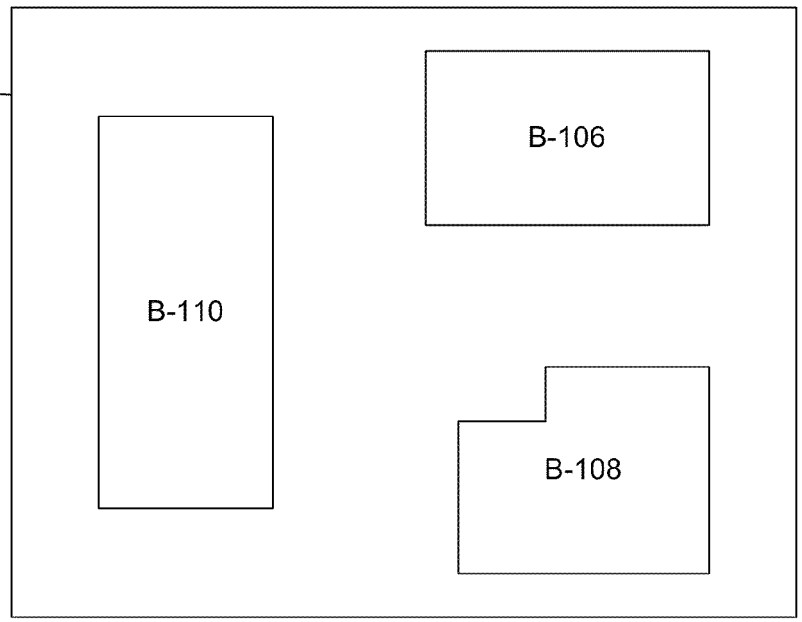

FIGS. 1A-1B illustrate examples of modifications that can be performed on a floorplan in accordance with some embodiments described herein. Specifically, FIG. 1A illustrates floorplan F-100 that includes blocks B-102, B-104, B-106, and B-108, and FIG. 1B illustrates examples of modifications that can be performed on the blocks shown in FIG. 1A. As shown in FIG. 1B, blocks B-102 and B-104 have been combined to form block B-110 (in general two or more blocks can be combined into a single block). Block B-106 has been resized, and the shape and size of block B-108 has been modified.

Figure 1C:
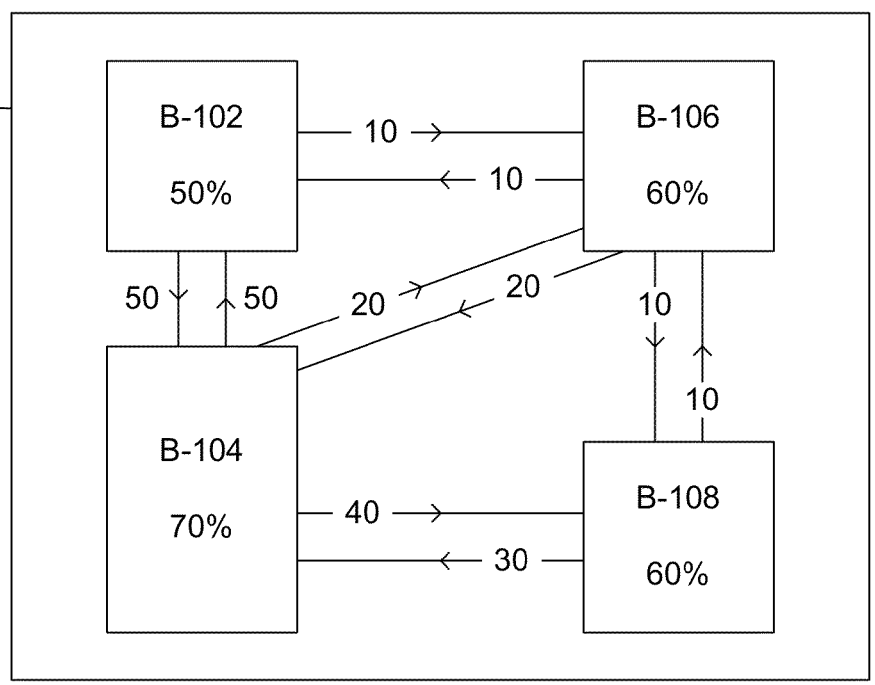
FIG. 1C illustrates examples of metrics that can be quickly updated when a floorplan is changed in accordance with some embodiments described herein.

FIG. 1C illustrates examples of metrics that can be quickly updated when a floorplan is changed in accordance with some embodiments described herein. Specifically, some embodiments quickly update the utilization and connection information when a user modifies a floorplan. As shown in FIG. 1C, blocks B-102, B-104, B-106, and B-108 have utilizations of 50%, 70%, 60%, and 60%, respectively. Each flyline (which is a line between two blocks) in FIG. 1C corresponds to a set of connections between two blocks, and the number shown in proximity to the arrow in the flyline corresponds to some piece of information associated with the connections. For example, if the numbers represent the total number of connections, then the flylines shown in FIG. 1C indicate that there are 40 connections from block B-104 to block B-108, and 30 connections from block B-108 to block B-104.

In some conventional approaches, the lines that represent the number of connections between two blocks are drawn from the center of one block to the center of the other block. However, this can give an unrealistic impression of the length of the connections in the actual circuit. Additionally, in some conventional approaches, only one connection line is used between two blocks.

In contrast to such conventional approaches, some embodiments described herein draw flylines between the closest edges or corners of two blocks. For example, as shown in FIG. 1C, all flylines are between the closest edges or corners of blocks. When flylines are displayed in this manner, the flylines more closely represent the actual connection length in the circuit design. Specifically, if the designer sees short flylines on the screen, it implies short connections in the actual circuit design. Furthermore, the information (e.g., connection count) associated with connections from a first block to the second block can be different from the information (e.g., connection count) associated with connections from the second block to the first block. Therefore, embodiments described herein display two separate flylines between each pair of blocks. This enables a user to easily see the information associated with the connections in each direction.

In some conventional approaches, the width of the connection line is proportional to the number of connections. However, this approach may not be able to convey connection information to the user in an effective manner. Specifically, if a particular connection width represents a large range of connections (e.g., between 1 and 2500 connections), then most connection lines would look identical, and the user may not be able to discern differences in the number of connections between different blocks (e.g., the same line width will be used for 10 connections and 1000 connections).

In contrast to such conventional approaches, some embodiments described herein allow for the width of the flyline to be proportional to the logarithm of the information that is being conveyed by the width of the flyline. For example, if the width of the flyline is being used to indicate the number of connections between two blocks, then the width can be proportional to the logarithm of the number of connections. Using a width that is proportional to the logarithm of the number of connections makes it much easier for the user to discern the important net count information.

Some embodiments use flylines to show timing metrics, which include, but are not limited to: (1) the worst slack on a timing path crossing between the blocks, (2) the number of timing paths crossing between the blocks with slack less than a given threshold (e.g., the number of violating paths if the threshold is equal to zero), and (3) a slack value such that a given percentile of timing paths has worse slack than the slack value (e.g., if the given percentile is 50%, then the slack that is displayed by the flyline would be the median slack over all connections between the two blocks).

In embodiments described herein, the information associated with a flyline can be displayed using one or more of the following flyline attributes: (1) width of the flyline (e.g., different widths can correspond to different value ranges or degrees), (2) color of the flyline (e.g., different colors can represent different value ranges or degrees), and (3) text in proximity to the flyline (e.g., the values displayed in proximity to the flylines in FIG. 1C).

In some embodiments, multiple pieces of information can be simultaneously displayed using one or more display techniques. For example, the color and width of the flyline can be used together to show two metrics at once. In one example, the width of the flyline can indicate the number of connections, and the color can indicate the worst slack. So, if there are 1000 connections and none of them are violating, then the flyline would be a thick green line. On the other hand, if half of the 1000 connections are violating, then the flyline would be a thick orange line.

In some embodiments, lines having different widths and different colors can be overlaid one the same flyline to show multiple metrics at once. For example, a first line having a first width and a first color can be used to represent the total number of connections, and a second line (that is overlaid on the first line) having a second width and a second color can be used to represent the number of violating connections. These two lines can be overlaid on the flyline to convey both pieces of information. For example, if there are 1000 connections, and none of them are violating, then the flyline would be a thick green line. On the other hand, if half of the 1000 connections are violating, then the flyline would be a thick green line with a thin red line overlaid on top, e.g., so that the thin red line runs longitudinally through the center of the thick green line.

When the floorplan is changed, some embodiments can quickly update the displayed information without actually changing the underlying circuit design. Specifically, the utilization of a block can be defined as the total area of the cells within a block divided by the total area of the block. When two or more blocks are combined into a single block, the total areas of the cells in the respective blocks can be summed up and divided by the total area of the single block to obtain the new utilization value. In this manner, the utilization of a block can be quickly updated and displayed to the user without actually changing the underlying circuit design, i.e., without actually changing the association between the circuit elements (e.g., cells) and blocks in the circuit design. In other words, after blocks B-102 and B-104 are combined to form block B-110, the underlying circuit design can continue to include blocks B-102 and B-104 (and the association between circuit elements and the blocks), and may not include block B-110. In these embodiments, block B-110 only exists in the graphical representation that is maintained by the GUI to allow users to quickly explore and evaluate modifications to the floorplan.

Likewise, when two or more blocks are combined, the connection information can be correspondingly combined, and the updated connection information can be displayed to the user. For example, if the numbers shown in FIG. 1C represent the number of connections, and if blocks B-102 and B-104 are combined into block B-110, then the number of connections between block B-110 and B-106 can be updated to 30 (10 connections between blocks B-102 and B-106+20 connections between blocks B-104 and B-106). In this manner, the connection information can be quickly updated and displayed to the user without actually changing the underlying design, i.e., without actually changing the routing of the circuit design. In other words, after blocks B-102 and B-104 are combined to form block B-110, the underlying circuit design can continue to include the same routing solution that existed before. When one or more blocks are resized or reshaped, the information displayed in the GUI (e.g., utilization and connection information) can be similarly updated without actually changing the underlying circuit design.

In some embodiments, timing information can be displayed for the connections between two blocks and the timing information can be quickly updated when the floorplan is modified. Specifically, when the relative distance between two blocks is changed, it can affect the timing of connections between those two blocks. In particular, the timing slack of connections between two blocks decreases as the two blocks are moved farther apart. In some embodiments, the timing information can be updated using conventional techniques, and the new timing information can then be displayed using the flylines. Specifically, as the user moves blocks closer together or farther apart, some embodiments continuously update the timing information (e.g., by using a conventional technique to update timing information) so that the attribute of the flyline (thickness, color, etc.) that is being used to convey timing information is also continuously updated. For example, as the user moves two block away from each other, the flyline between those two blocks can change color from green to red (assuming that the color green represents few timing violations and the color red represents many timing violations). As explained above, the updated timing information can be encoded using one or more of the color attribute, a width attribute, or text.

Some embodiments can quickly compute a new delay value for each timing path between two blocks that are moved closer or farther apart by using systems and techniques described in U.S. application Ser. No. 13/725,725, entitled "Automated approach to planning critical signals and busses," by inventor David Peart, filed on 21 Dec. 2012, the contents of which are herein incorporated by reference in their entirety for all purposes. If the delay increases for a connection because the two blocks were moved farther apart, then the slack of the connection is decreased by the same amount. Conversely, if the delay decreases for a connection because the two blocks were moved closer together, then the slack of the connection is increased by the same amount.

Figure 2:
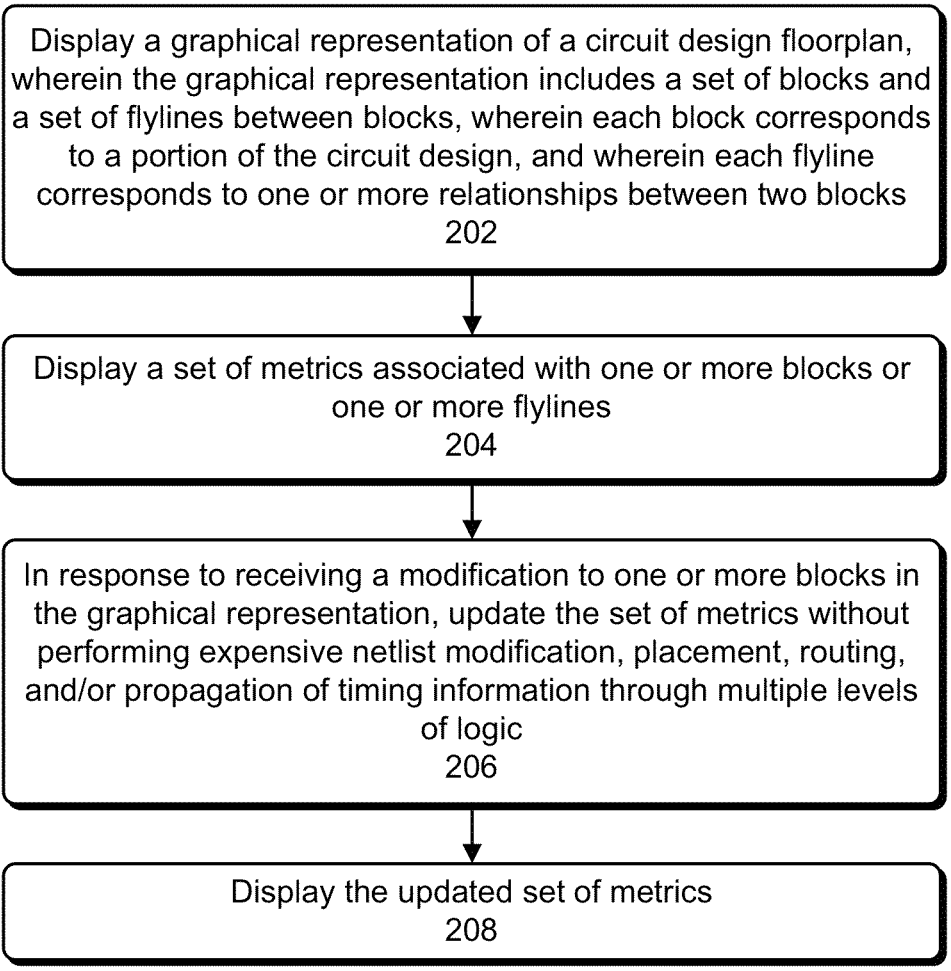
FIG. 2 illustrates a process for facilitating a user to explore modifications to a circuit design floorplan in accordance with some embodiments described herein.

FIG. 2 illustrates a process for facilitating a user to explore modifications to a circuit design floorplan in accordance with some embodiments described herein. The process can begin by displaying a graphical representation of a circuit design floorplan, wherein the graphical representation includes a set of blocks and a set of flylines between blocks, wherein each block corresponds to a portion of the circuit design, and wherein each flyline corresponds to one or more relationships between two blocks (operation 202). Furthermore, the process can display a set of metrics associated with one or more blocks or one or more flylines (operation 204). For example, FIG. 1C illustrates a graphical representation of a circuit design floorplan and a set of metrics that are associated with blocks and flylines.

In some embodiments, the set of metrics includes a utilization metric that is associated with a block, and wherein the utilization metric is computed by dividing a total cell area by a total block area. In some embodiments, the set of metrics includes a connection count metric that is associated with a flyline, and wherein the connection count metric is equal to the number of connections between the two blocks that correspond to the flyline. In some embodiments, the set of metrics includes a timing metric that is associated with a flyline, wherein the timing metric is equal to one of: a worst slack on a timing path between two blocks associated with the flyline, a count of timing paths whose slack is less than a given threshold, or a slack value such that a given percentile of timing paths has worse slack than the slack value. In some embodiments, one or more metrics associated with a flyline are represented using one or more of a color attribute, a width attribute, or text.

Next, in response to receiving a modification to one or more blocks in the graphical representation, the process can update the set of metrics without performing expensive netlist modification, placement, routing, and/or propagation of timing information through multiple levels of logic (operation 206). In some embodiments, the modification to the block involves at least one of: resizing the block, reshaping the block, or moving the block. For example, if the numbers shown in FIG. 1C represent the number of connections, and if the received modification combines blocks B-102 and B-104 into block B-110, then the number of connections between block B-110 and B-106 can be updated to 30 (10 connections between blocks B-102 and B-106+20 connections between blocks B-104 and B-106). Note that the number of connections are updated without actually rerouting the connections in the circuit design floorplan, i.e., without performing expensive netlist modification, placement, routing, and/or propagation of timing information through multiple levels of logic. The process can then display the updated set of metrics (operation 208).

Computer System

Figure 3:
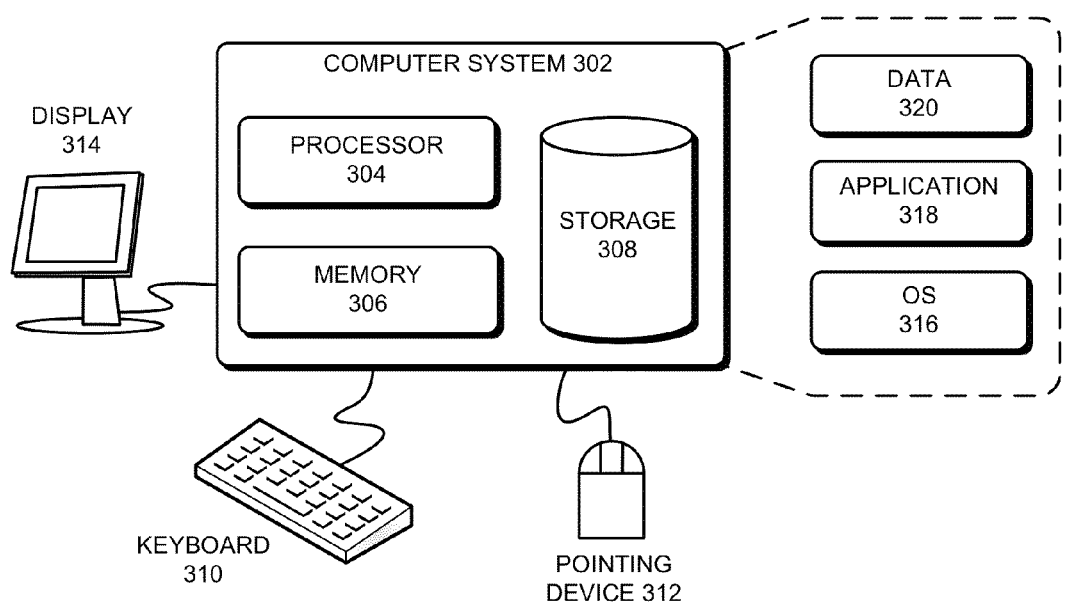
FIG. 3 illustrates a computer system in accordance with some embodiments described herein.

FIG. 3 illustrates a computer system in accordance with some embodiments described herein. Computer system 302 can include processor 304, memory 306, and storage device 308. Computer system 302 can be coupled to display device 314 (which may or may not be capable of detecting the presence, location, and/or movement of a touch within the display area), keyboard 310, and pointing device 312. Storage device 308 can store operating system 316, application 318, and data 320. Data 320 can include input required by application 318 and/or output generated by application 318.

Computer system 302 may perform one or more operations (either automatically or with user input) in any method that is implicitly or explicitly described in this disclosure. For example, during operation, computer system 302 can load application 318 into memory 306. Application 318 can then be used by a user to create, view, and/or edit a floorplan for a circuit design.

CONCLUSION

The above description is presented to enable any person skilled in the art to make and use the embodiments. Various modifications to the disclosed embodiments will be readily apparent to those skilled in the art, and the general principles defined herein are applicable to other embodiments and applications without departing from the spirit and scope of the present disclosure. Thus, the present invention is not limited to the embodiments shown, but is to be accorded the widest scope consistent with the principles and features disclosed herein.

The data structures and code described in this disclosure can be partially or fully stored on a computer-readable storage medium and/or a hardware module and/or hardware apparatus. A computer-readable storage medium includes, but is not limited to, volatile memory, non-volatile memory, magnetic and optical storage devices such as disk drives, magnetic tape, CDs (compact discs), DVDs (digital versatile discs or digital video discs), or other media, now known or later developed, that are capable of storing code and/or data. Hardware modules or apparatuses described in this disclosure include, but are not limited to, application-specific integrated circuits (ASICs), field-programmable gate arrays (FPGAs), dedicated or shared processors, and/or other hardware modules or apparatuses now known or later developed.

The methods and processes described in this disclosure can be partially or fully embodied as code and/or data stored in a computer-readable storage medium or device, so that when a computer system reads and executes the code and/or data, the computer system performs the associated methods and processes. The methods and processes can also be partially or fully embodied in hardware modules or apparatuses, so that when the hardware modules or apparatuses are activated, they perform the associated methods and processes. Note that the methods and processes can be embodied using a combination of code, data, and hardware modules or apparatuses.

The foregoing descriptions of embodiments of the present invention have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for facilitating a user to explore different modifications to a circuit design floorplan, the method comprising:
    displaying a graphical representation of a circuit design floorplan, wherein the graphical representation includes a set of blocks and a set of flylines between blocks, wherein each block corresponds to a portion of the circuit design, and wherein each flyline corresponds to one or more relationships between two blocks;
    displaying a set of metrics associated with one or more blocks or one or more flylines in the graphical representation of the circuit design floorplan;
    in response to receiving a modification to one or more blocks in the graphical representation, updating, by using one or more processors, the set of metrics without performing any of the following expensive operations: netlist modification, placement, routing, and propagation of timing information through multiple levels of logic; and
    displaying the updated set of metrics in the graphical representation of the circuit design floorplan.

2. The method of claim 1, wherein the set of metrics includes a utilization metric that is associated with a block, and wherein the utilization metric is computed by dividing a total cell area by a total block area.

3. The method of claim 1, wherein the set of metrics includes a connection count metric that is associated with a flyline, and wherein the connection count metric is equal to the number of connections between the two blocks that correspond to the flyline.

4. The method of claim 1, wherein the set of metrics includes a timing metric that is associated with a flyline, wherein the timing metric is equal to one of:
    a worst slack on a timing path between two blocks associated with the flyline,
    a count of timing paths whose slack is less than a given threshold, or
    a slack value such that a given percentile of timing paths has worse slack than the slack value.

5. The method of claim 1, wherein one or more metrics associated with a flyline are represented using one or more of a color attribute, a width attribute, or text.

6. The method of claim 1, wherein the modification involves at least one of: resizing a block, reshaping a block, or moving a block.

7. A non-transitory computer-readable storage medium storing instructions that, when executed by a computer, cause the computer to perform a method for facilitating a user to explore different modifications to a circuit design floorplan, the method comprising:
    displaying a graphical representation of a circuit design floorplan, wherein the graphical representation includes a set of blocks and a set of flylines between blocks, wherein each block corresponds to a portion of the circuit design, and wherein each flyline corresponds to one or more relationships between two blocks;

displaying a set of metrics associated with one or more blocks or one or more flylines in the graphical representation of the circuit design floorplan;

in response to receiving a modification to one or more blocks in the graphical representation, updating the set of metrics without performing any of the following expensive operations: netlist modification, placement, routing, and propagation of timing information through multiple levels of logic; and displaying the updated set of metrics in the graphical representation of the circuit design floorplan.

8. The non-transitory computer-readable storage medium of claim 7, wherein the set of metrics includes a utilization metric that is associated with a block, and wherein the utilization metric is computed by dividing a total cell area by a total block area.

9. The non-transitory computer-readable storage medium of claim 7, wherein the set of metrics includes a connection count metric that is associated with a flyline, and wherein the connection count metric is equal to the number of connections between the two blocks that correspond to the flyline.

10. The non-transitory computer-readable storage medium of claim 7, wherein the set of metrics includes a timing metric that is associated with a flyline, wherein the timing metric is equal to one of:
 a worst slack on a timing path between two blocks associated with the flyline,
 a count of timing paths whose slack is less than a given threshold, or
 a slack value such that a given percentile of timing paths has worse slack than the slack value.

11. The non-transitory computer-readable storage medium of claim 7, wherein one or more metrics associated with a flyline are represented using one or more of a color attribute, a width attribute, or text.

12. The non-transitory computer-readable storage medium of claim 7, wherein the modification involves at least one of: resizing a block, reshaping a block, or moving a block.

13. An apparatus, comprising:
 a processor; and
 a non-transitory storage medium storing instructions that, when executed by the processor, cause the apparatus to perform a method for facilitating a user to explore different modifications to a circuit design floorplan, the method comprising:
 displaying a graphical representation of a circuit design floorplan, wherein the graphical representation includes a set of blocks and a set of flylines between blocks, wherein each block corresponds to a portion of the circuit design, and wherein each flyline corresponds to one or more relationships between two blocks;
 displaying a set of metrics associated with one or more blocks or one or more flylines in the graphical representation of the circuit design floorplan;
 in response to receiving a modification to one or more blocks in the graphical representation, updating the set of metrics without performing any of the following expensive operations: netlist modification, placement, routing, and/or propagation of timing information through multiple levels of logic; and
 displaying the updated set of metrics in the graphical representation of the circuit design floorplan.

14. The apparatus of claim 13, wherein the set of metrics includes a utilization metric that is associated with a block, and wherein the utilization metric is computed by dividing a total cell area by a total block area.

15. The apparatus of claim 13, wherein the set of metrics includes a connection count metric that is associated with a flyline, and wherein the connection count metric is equal to the number of connections between the two blocks that correspond to the flyline.

16. The apparatus of claim 13, wherein the set of metrics includes a timing metric that is associated with a flyline, wherein the timing metric is equal to one of:
 a worst slack on a timing path between two blocks associated with the flyline,
 a count of timing paths whose slack is less than a given threshold, or
 a slack value such that a given percentile of timing paths has worse slack than the slack value.

17. The apparatus of claim 13, wherein one or more metrics associated with a flyline are represented using one or more of a color attribute, a width attribute, or text.

18. The apparatus of claim 13, wherein the modification involves at least one of: resizing a block, reshaping a block, or moving a block.

* * * * *